(12) United States Patent
Liu et al.

(10) Patent No.: US 7,858,554 B2
(45) Date of Patent: Dec. 28, 2010

(54) CORDIERITE FIBER SUBSTRATE AND METHOD FOR FORMING THE SAME

(75) Inventors: James Jenq Liu, Mason, OH (US); Bilal Zuberi, Cambridge, MA (US); Jerry G. Weinstein, Malta, NY (US); Rachel A. Dahl, Cambridge, MA (US); William M. Carty, Alfred Station, NY (US)

(73) Assignee: Geo2 Technologies, Inc., Woburn, MA (US)

( * ) Notice: Subject to any disclaimer, the term of this patent is extended or adjusted under 35 U.S.C. 154(b) by 625 days.

(21) Appl. No.: 11/753,011

(22) Filed: May 24, 2007

(65) Prior Publication Data

US 2008/0292518 A1 Nov. 27, 2008

(51) Int. Cl.
*B01J 23/00* (2006.01)
*B01J 21/00* (2006.01)
*B01J 20/00* (2006.01)
*C04B 38/00* (2006.01)
*C04B 35/00* (2006.01)

(52) U.S. Cl. .............. 502/439; 502/240; 502/263; 502/407; 502/415; 502/527.14; 501/80; 501/95.1; 501/95.2

(58) Field of Classification Search .......... 502/240, 502/263, 407, 415, 439, 527.14; 501/95.1, 501/95.2, 80
See application file for complete search history.

(56) References Cited

U.S. PATENT DOCUMENTS

| | | | |
|---|---|---|---|
| 4,434,239 A | 2/1984 | Aitcin | |
| 4,673,658 A | 6/1987 | Gadkaree et al. | |
| 4,718,926 A * | 1/1988 | Nakamoto et al. | 55/523 |
| 4,973,566 A * | 11/1990 | Readey et al. | 501/129 |
| 5,139,851 A * | 8/1992 | Acocella et al. | 428/209 |
| 5,139,852 A * | 8/1992 | Baise et al. | 428/209 |
| 5,188,779 A * | 2/1993 | Horikawa et al. | 264/630 |
| 5,221,484 A | 6/1993 | Goldsmith et al. | |
| 5,258,150 A | 11/1993 | Merkel et al. | |
| 5,290,522 A | 3/1994 | Rogers et al. | |
| RE34,853 E * | 2/1995 | DeAngelis et al. | 502/439 |
| 5,422,319 A * | 6/1995 | Stempin et al. | 501/9 |
| 6,077,483 A * | 6/2000 | Locker et al. | 422/179 |
| 6,300,266 B1 * | 10/2001 | Beall et al. | 501/119 |
| 6,319,870 B1 * | 11/2001 | Beall et al. | 501/119 |
| 6,391,437 B1 * | 5/2002 | Kadomura et al. | 428/307.3 |
| 6,541,407 B2 | 4/2003 | Beall et al. | |
| 7,179,316 B2 | 2/2007 | Merkel et al. | |
| 7,521,025 B2 * | 4/2009 | Ohno et al. | 422/168 |
| 7,550,117 B2 * | 6/2009 | Alward et al. | 422/177 |
| 7,572,416 B2 * | 8/2009 | Alward et al. | 422/180 |
| 7,640,732 B2 * | 1/2010 | Zuberi et al. | 60/299 |
| 7,785,544 B2 * | 8/2010 | Alward et al. | 422/179 |

(Continued)

FOREIGN PATENT DOCUMENTS

WO WO-03/031368 4/2003

*Primary Examiner*—Cam N Nguyen

(57) ABSTRACT

A porous cordierite substrate and a method of forming a porous cordierite substrate including providing a fiber that includes at least one cordierite precursor material and providing at least one organic binder material. The fiber and the organic binder material are mixed with a fluid. The mix of fiber, organic binder material and fluid is extruded into a green substrate. The green substrate is fired to enable the formation of bonds between the fibers and to form a porous cordierite fiber substrate.

18 Claims, 4 Drawing Sheets

U.S. PATENT DOCUMENTS

| | | | |
|---|---|---|---|
| 2003/0165638 A1* | 9/2003 | Louks et al. | 427/600 |
| 2004/0091709 A1 | 5/2004 | Ohmura et al. | |
| 2004/0148916 A1 | 8/2004 | Merkel | |
| 2004/0231307 A1 | 11/2004 | Wood et al. | |
| 2005/0212186 A1 | 9/2005 | Noguchi et al. | |
| 2006/0121240 A1* | 6/2006 | Hirai et al. | 428/116 |
| 2007/0077190 A1* | 4/2007 | Ohno | 423/345 |
| 2008/0242530 A1* | 10/2008 | Liu et al. | 501/95.1 |
| 2008/0283465 A1* | 11/2008 | Liu et al. | 210/496 |
| 2009/0000260 A1* | 1/2009 | Liu et al. | 55/523 |
| 2009/0136709 A1* | 5/2009 | Zuberi et al. | 428/116 |
| 2009/0166910 A1* | 7/2009 | Marshall et al. | 264/46.1 |
| 2010/0048374 A1* | 2/2010 | Liu et al. | 501/4 |

\* cited by examiner

CORDIERITE FIBER SUBSTRATE AND METHOD FOR FORMING THE SAME

FIELD OF THE INVENTION

The present invention relates to porous cordierite substrates and more specifically to porous cordierite substrates produced from non-cordierite fiber materials.

BACKGROUND

Porous substrates are available for various filtration and separation processes. For example, porous substrates with catalytic materials deposited on the substrate are commonly used to reduce particulate emissions and convert toxic exhaust gas into less toxic gases. Substrates that have relatively high porosity (i.e., percentage of void space in the material) and relatively high thermal shock resistance (e.g., due to low thermal expansion) may provide the greatest efficiency and effectiveness. While a variety of materials have been used in particulate filter and catalytic converter applications, cordierite has proven to be well suited to such use.

Cordierite is commonly formed from raw materials including magnesia, alumina and silica in powder form. Extrusion of ceramic powder materials has proven to be an effective and cost efficient method of producing ceramic substrates for the environmental controls industry. However, there is an upper limit to the porosity in extruded ceramic powder materials. If the porosity of the extruded substrate formed from powder ceramic materials is exceeded, the strength and functionality of the substrate may be compromised.

Therefore, there exists a need for a cordierite substrate having high porosity and permeability, while the strength is maintained for various applications.

SUMMARY

The present invention provides a porous cordierite substrate formed from non-cordierite fiber materials.

In general, in one aspect, the invention features a method of forming a porous cordierite substrate including providing a fiber that includes at least one cordierite precursor material and providing at least one organic binder material. The fiber and the organic binder material are mixed with a fluid. The mix of fiber, organic binder material and fluid is extruded into a green substrate. The green substrate is fired to enable the formation of bonds between the fibers and to form a porous cordierite fiber substrate.

The method may feature one or more of the following aspects. In some implementations, alumina may be provided and mixed with the fiber, organic binder and fluid. Similarly, silica may be provided and mixed with the fiber, binder and fluid. Similarly, magnesia may be provided and mixed with the fiber, binder and fluid. The alumina may be provided in the form of colloidal alumina. The silica may be provided in the form of colloidal silica. The magnesia may be provided in the form of magnesium carbonate. In some implementations, a pore former material may be provided and mixed with the fiber, binder and fluid.

In some implementations, the fiber may include biosoluble magnesium silicate fiber. Alternatively, the fiber may include magnesia-alumina-silicate fiberglass. Similarly, the fiber may include an aluminosilicate fiber. In some embodiments, the fiber may include at least one of an alumina fiber, a silica fiber, and a magnesia fiber. The porous cordierite fiber substrate may have a porosity of greater than 40 percent.

In some implementations, firing the green substrate may include drying the green substrate to remove a substantial portion of the fluid. The green substrate may be heated to enable binder material burn off. The green substrate may be sintered to enable formation of bonds between the fibers. The sintering may be done at a cordierite formation temperature based upon phase formation data for the fiber. The green substrate may be sintered at a temperature below $1400°$ C.

In general, in another aspect, the invention features a porous cordierite fiber substrate including an extruded substrate with an extrusion composition including a fluid, at least one organic binder material and fiber including at least one cordierite precursor material. The extruded substrate is sintered to consolidate regions between the fibers and to form a fired substrate including a cordierite composition.

One or more of the following features may be included. In some embodiments, alumina may be mixed into the extrusion composition. Similarly, silica may be mixed into the extrusion composition. Similarly, in some embodiments, magnesia may be mixed into the extrusion composition. In some embodiments, a pore former material may be mixed into the extrusion composition.

In some embodiments, the organic binder material and the fluid may be substantially burned off as the extruded substrate is heated for sintering. In other embodiments, the pore former material and the fluid may be substantially burned off as the extruded substrate is heated for sintering. The extruded substrate may be sintered at a cordierite formation temperature based upon phase formation data for the fiber.

In some embodiments, at least one of solid state bonds, glass-ceramic bonds, and crystalline bonds may be formed between the fibers. In other embodiments, glass bonds may be formed between the fibers.

In general, in another aspect, the invention features a porous cordierite substrate including a non-cordierite extruded substrate including one of biosoluble silica-magnesia fiber or magnesia alumina silicate fiberglass, at least one organic binder material and a fluid. The non-cordierite extruded substrate is sintered to form bonds between the fibers and to form a substrate including a cordierite composition.

In some embodiments, the non-cordierite extruded substrate may also include a pore former material. The fluid may be de-ionized water.

In some embodiments, the pore former material and the fluid may be substantially burned off as the non-cordierite extruded substrate is heated for sintering. In other embodiments the organic binder material and the fluid may be substantially burned off as the non-cordierite extruded substrate is heated for sintering. The non-cordierite extruded substrate may be sintered at a cordierite formation temperature for the extruded substrate including biosoluble silica-magnesia fiber or magnesia alumina silicate fiberglass.

In some embodiments, at least one of solid state bonds, glass-ceramic bonds, and crystalline bonds may be formed between the fibers. In other embodiments, glass bonds may be formed between the fibers.

Details of one or more implementations are set forth in the accompanying drawings and the description below. Other features and advantages of the invention are apparent from the following description, the drawings and the claims.

DETAILED DESCRIPTION

Figure 1:
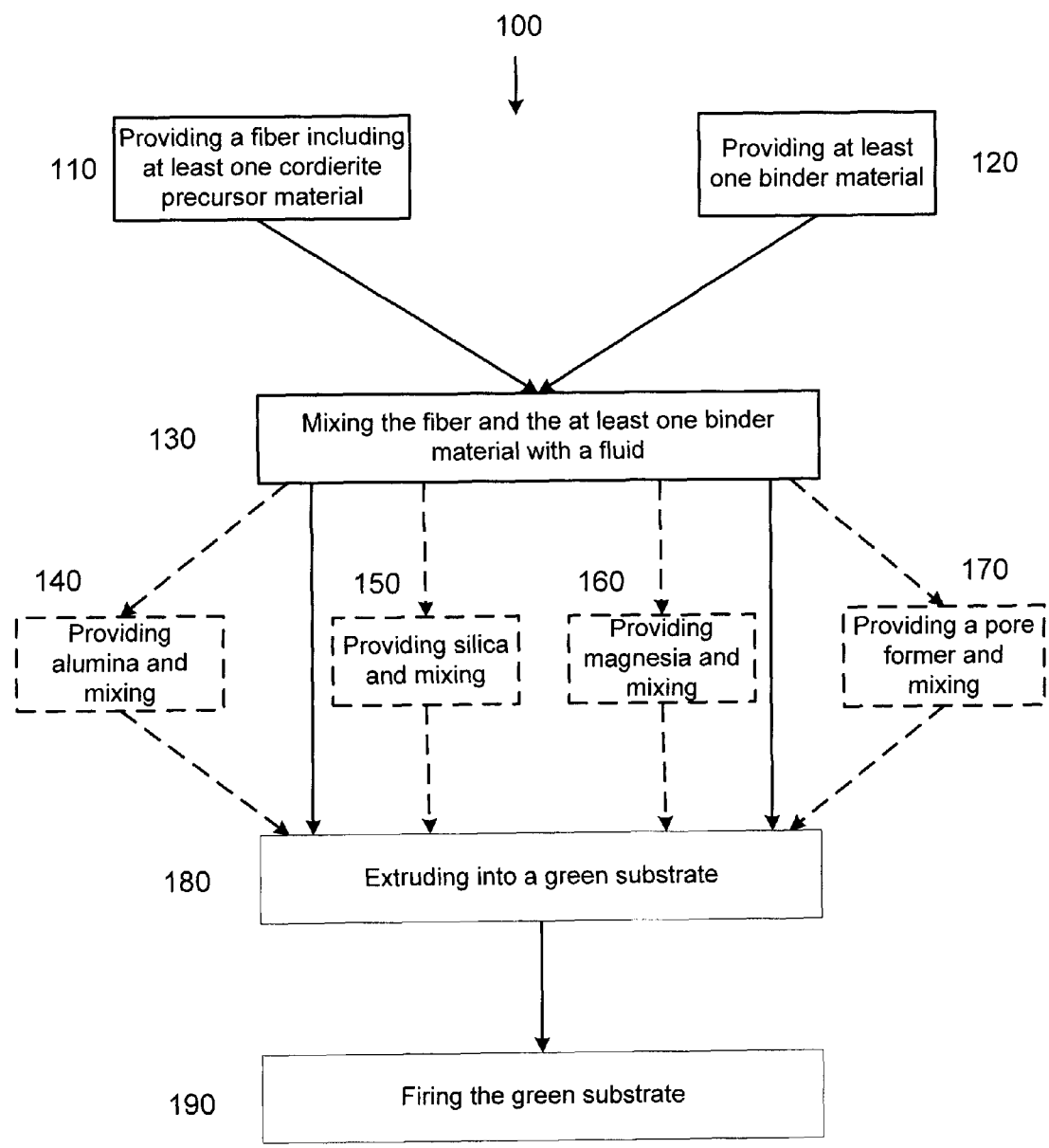
FIG. 1 is a flowchart of an exemplary method of forming a porous cordierite substrate.
Figure 2:
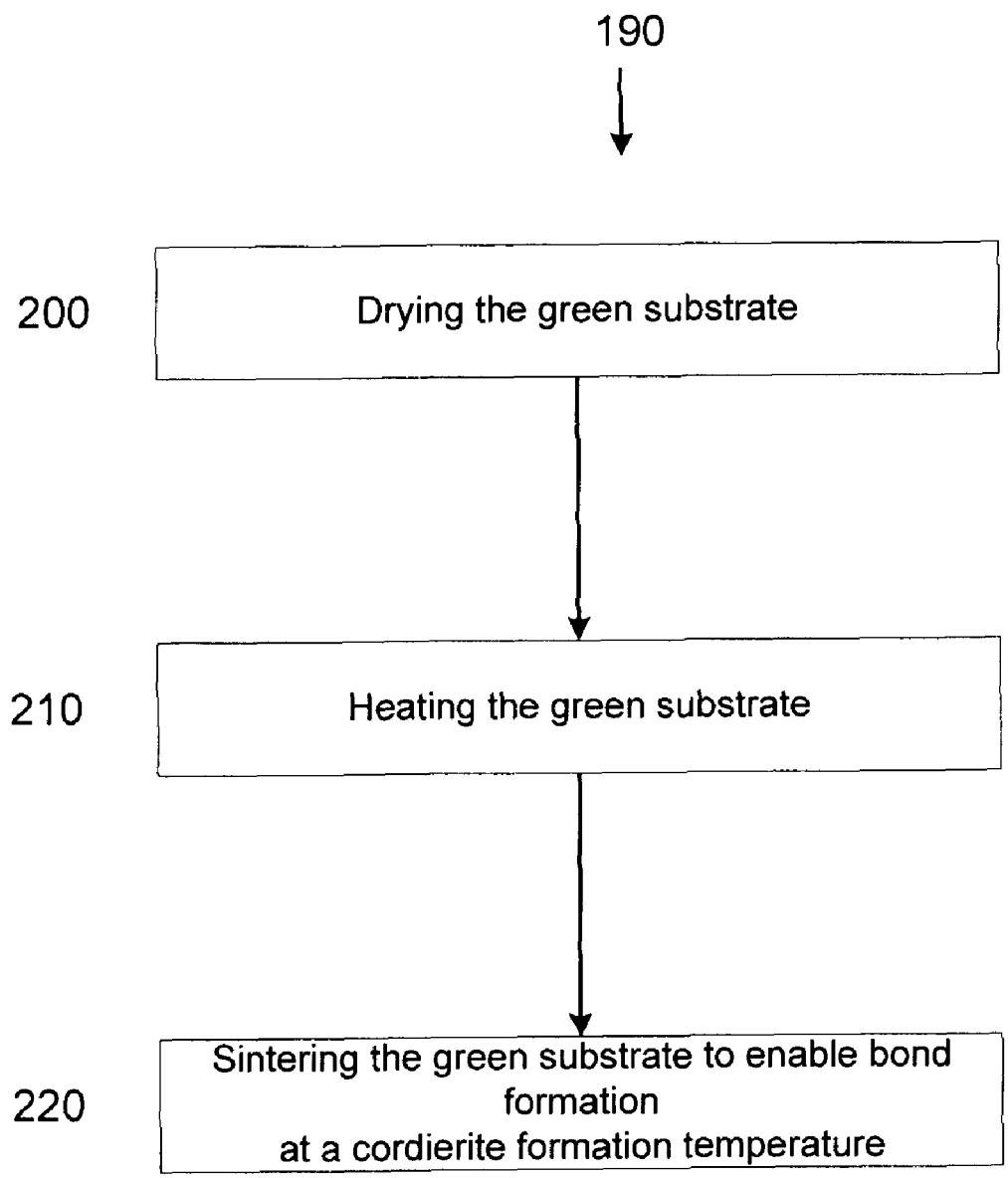
FIG. 2 is a flow chart of an exemplary method of sintering a green substrate.
Figure 3:
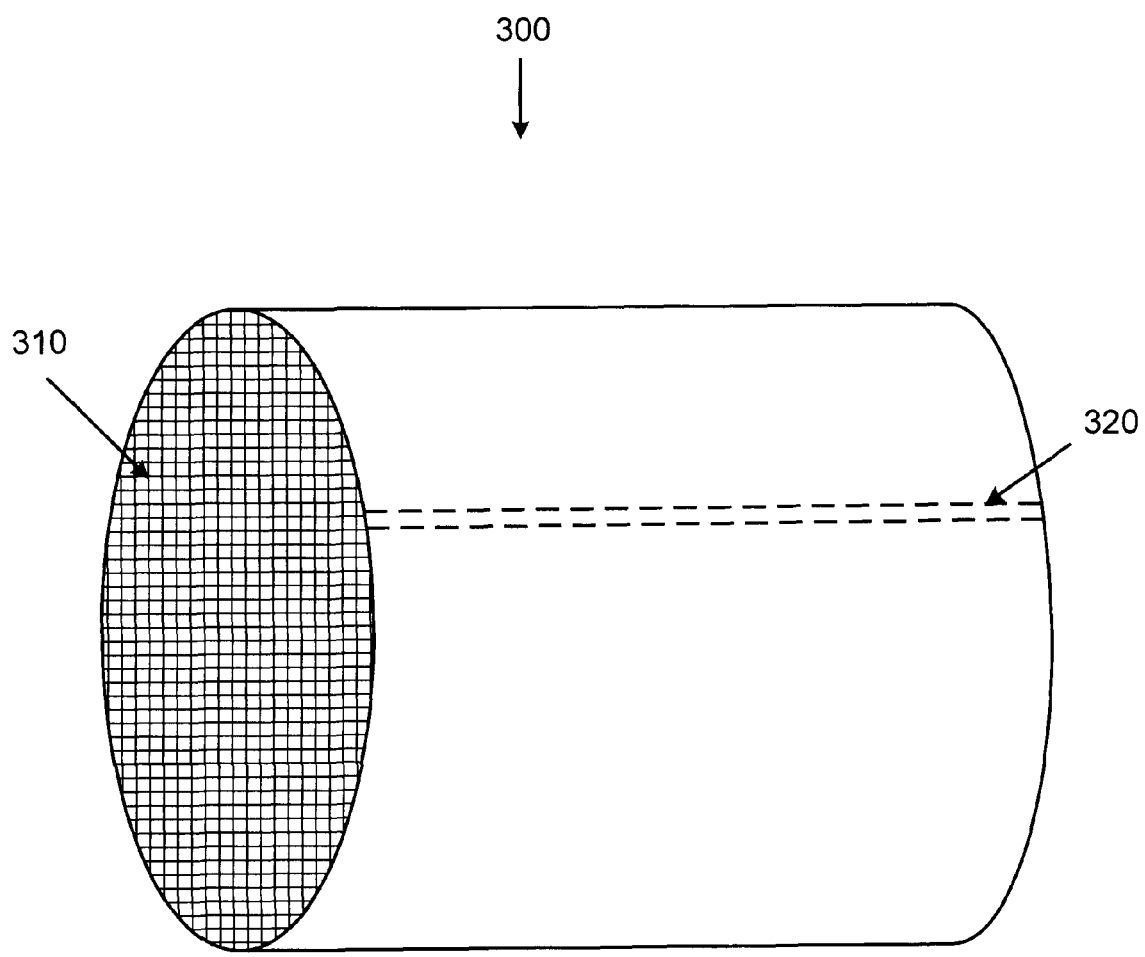
FIG. 3 is an illustration of an exemplary substrate with honeycomb cross section.

Referring to FIGS. 1, 2 and 3, an exemplary porous cordierite fiber substrate 300 may be formed from cordierite-precursor materials according to an exemplary method 100 described herein. The method 100 may include the use of at least one fibrous cordierite precursor material. Cordierite is a ceramic material with a molecular formula of $2(MgO).2(Al_2O_3).5(SiO_2)$. Thus, in order to form cordierite, the cordierite-precursor materials may include at least one of magnesia (MgO), alumina ($Al_2O_3$) and silica ($SiO_2$). At least one, or any combination, of the cordierite precursor materials may be in fiber form. The fibers can be a single composition, or mixed composition, and possibly all of the cordierite precursor materials can be in fiber form. While, a variety of raw materials may be used to produce cordierite, cordierite content in a final product may be related to the purity of the magnesia, alumina and silica provided by the cordierite precursor materials. The purity of the cordierite precursor materials, as well as the relative content of other materials may vary depending upon the desired composition of the product.

The method 100 of forming a porous cordierite substrate may include providing 110 a fiber including at least one cordierite precursor material. For example, alumina fiber, silica fiber, magnesia fiber, magnesia alumina silicate fiber, magnesium silicate fiber, aluminosilicate (including aluminosilicate in the mullite phase) fiber or any combination thereof may be used. The fiber including at least one cordierite precursor material may allow a relatively higher porosity to be achieved. A fiber may be generally defined as a material having an aspect ratio greater than one, as compared to powder, for which the particles may have an aspect ratio of about one. The aspect ratio is the ratio of the length of the fiber divided by the diameter of the fiber. The fibers may be on the scale of 2.0 to 9.0 microns in diameter, with an aspect ratio distribution between about 3 and about 1000, however, fibers having a diameter between 1 and 30 microns can be used, with aspect ratios between 1 and 100,000. In other embodiments, the aspect ratio of the fibers may be in the range of about 3 to about 500. The fibers may be chopped to achieve the desired aspect ration for extrusion The fibers may be, for example, ceramic oxide fibers or glass fibers in crystalline, partially crystalline or amorphous form. Fibers including at least one cordierite precursor material may include, for example, biosoluble magnesium silicate fibers or magnesia-alumina-silicate fiberglass (e.g., S-glass). The use of a magnesium-based biosoluble fiber may be beneficial because, while most refractory ceramic fibers are typically considered carcinogens and are highly regulated in Europe, magnesium-based biosoluble fibers are not considered carcinogenic. Thus, magnesium-based biosoluble fibers may be easier to obtain and handle for worldwide production of substrates. Similar to the magnesium-based biosoluble fiber, magnesia-alumina-silicate fiberglass may not be a regulated carcinogenic material, so materials for producing fiber-based substrates can easily be obtained for worldwide production. ISOFRAX is a magnesium-based biosoluble fiber that can be obtained from Unifrax Corporation, Niagara Falls, N.Y., though other fibers including magnesium silicate may also be used.

At least one organic binder material may also be provided 120. Organic binders may typically be polymeric materials that, for example, when added to a suspension of ceramic particles may aid in adjusting the rheology of the suspension, e.g., through dispersion or flocculation of the particles. Water soluble organic binders, such as hydroxypropyl methyl cellulose, may work advantageously for extrusion applications, though other binders or multiple binders may be used. For example, in a suspension that is too fluid for extrusion, a binder may be added to thicken, or increase the apparent viscosity of the suspension. A plastic ceramic material may have a relatively high shear strength, which may facilitate extrusion. In extrusion applications, binders may aid in providing plasticity and obtaining flow characteristics that may aid in extrusion of the material. Additionally, binders may be used to help improve the pre-firing, or green strength of an extruded substrate. While the addition of an organic binder material has been described, other additives may be used to aid in controlling the rheology of the suspension.

The fiber and the at least one organic binder material may be mixed 130 with a fluid. Mixing 130 the fibers, organic binder and fluid may enable suspension of the fibers in the fluid. Once the fibers are suspended, the rheology of the suspension may be further adjusted for extrusion as needed. The fibers, organic binder, and fluid may be mixed 130, e.g., using a high-shear mixer, to improve dispersion of the fibers and aid in producing the desired plasticity for a particular processing application, e.g., extrusion. The suspension may include less than about 60 volume percent fiber, resulting in a substrate having greater than about 40% porosity. Deionized water may be used as the fluid for suspension, though other fluids such as ionic solutions may be used.

Additional raw materials may be included in the mixture, e.g., to provide additional cordierite precursor materials, to adjust the rheology of the mixture, to allow the inclusion of other materials in the final structure, and to modify the cordierite content in the final structure. While the fiber may include the stoichiometric amounts of magnesia, alumina and silica necessary to form cordierite, additional raw materials may be added to achieve the desired stoichiometry if the selected fiber is deficient. For example, if a fiber composed of magnesia and silica in a ratio of 2 moles of magnesia per 5 moles of silica is selected, additional raw materials may be needed to provide the alumina necessary for cordierite formation. Similarly, if a fiber composed of magnesia, alumina and silica in a ratio of 2 moles of magnesia and 1 mole alumina per 2 moles of silica is selected, then additional alumina and silica may be needed for cordierite formation. Similarly, if a fiber composed of alumina and silica in a ratio of 2 moles of alumina per 5 moles of silica is selected, additional raw materials may be needed to provide the magnesia necessary for cordierite formation. In such instances, alumina, magnesia and/or silica may be mixed 140, 150, 160 with the fiber, binder and fluid to provide a stoichiometric suspension composition for cordierite formation. The additional alumina, magnesia and silica may be provided in the form of colloidal alumina, magnesia or a magnesia precursor material such as magnesium carbonate, and colloidal silica, though other raw material sources of alumina, magnesia and silica may be used.

Similarly, a pore former material may be mixed 170 with the fibers, binder, and fluid. The pore former may aid in increasing porosity in the final fired substrate. The pore former material may be spherical, elongated, fibrous, or irregular in shape. The pore former may aid in the formation of porosity in a number of ways. For example, the pore former may assisting in fiber alignment and orientation. The pore former may assist in arranging fibers into an overlapping pattern to facilitate proper bonding between fibers during firing. Additionally, during firing of the substrate, the pore former may be substantially burned off. When the pore former burns off during firing, the space that the pore former had occupied may become open, increasing porosity. Graphite, or carbon, powder may be used as a pore former, though other pore former materials may also be used.

The mixture of fiber, organic binder, fluid, and any other materials included in the mixture, may be extruded 180 to form a green substrate (i.e., an unfired extruded article). The extruder may be, for example, a piston extruder, a single screw, or auger, extruder, or a twin screw extruder. In catalytic converter and particulate filter applications, the mixture of fiber, binder, fluid and other ingredients may be extruded 180 through a die configured to produce a "honeycomb" cross section. The honeycomb configuration 310 may be generally characterized by cells 320 that may run the length of the substrate 300. Substrates 300 with the honeycomb 310 cross section are often described by number of cells 320 per square inch.

The green substrate that may be extruded 180 may be fired 190, enabling consolidation and bond formation between fibers and may ultimately form a porous cordierite fiber substrate. Firing 190 may include several processes. The green substrate may be dried 200 in order to remove a substantial portion of the fluid, e.g., through evaporation. The drying 200 process may be controlled in order to limit defects, e.g., resulting from gas pressure build-up or differential shrinkage. Drying 200 may be conducted in open air, by controlled means, such as in a convection, conduction or radiation dryer, or within a kiln.

As the green substrate is heated 210, the organic binder and pore former may begin to burn off. Most organic binders will burn off at temperatures below 500° C. The increase in temperature may cause the hydrocarbons in the polymer to degrade and vaporize, which may result in weight loss. The organic binder burn off may enable fiber-to-fiber contact, and may form an open pore network. A pore former, such as particulate carbon, typically oxidizes and burns off at about 1000° C., further increasing porosity.

The dried green substrate may be sintered 220 to enable the formation of bonds between fibers. Sintering 220 may generally involve the consolidation of the substrate, characterized by the formation of bonds between the fibers to form an aggregate with strength. Several types of bonds may form during the sintering 220 process and the types of bonds formed may depend upon multiple factors, including, for example, the starting materials and the time and temperature of sintering 220. In some instances, glass bonds may form between fibers. Glass bonding is typically characterized by the formation of a glassy or amorphous phase at the intersection of fibers. In other instances, solid state bonds, glass-ceramic bonds and crystalline bonds may form by consolidation of a region between fibers. Solid state, glass-ceramic, and crystalline bonding are characterized by grain growth and mass transfer between overlapping fibers. Glass bonds typically occur at lower temperatures than solid state and crystalline bonds.

While sintering 220 may occur over a range of temperatures, the substrate may be fired at a sufficient temperature for the in-situ formation of cordierite crystals. Powder-based cordierite typically forms between 1400 and 1470° C., depending upon the composition of the mixture of ingredients present during sintering. Over this temperature range, the amount of liquid in the system may rapidly change with small increases in temperature. According to the present disclosure, cordierite may form at a sintering temperature between 1000 and 1470° C., depending upon the composition of the mixture of fibers and other ingredients present in the substrate during sintering. Firing may be controlled based upon the amount of magnesia, alumina and silica in the green substrate in order to ensure optimal conditions for cordierite formation. During firing, the magnesia, alumina and silica in the substrate may combine and crystallize to form cordierite, resulting in a highly porous fiber-based cordierite substrate 300.

Figure 4:
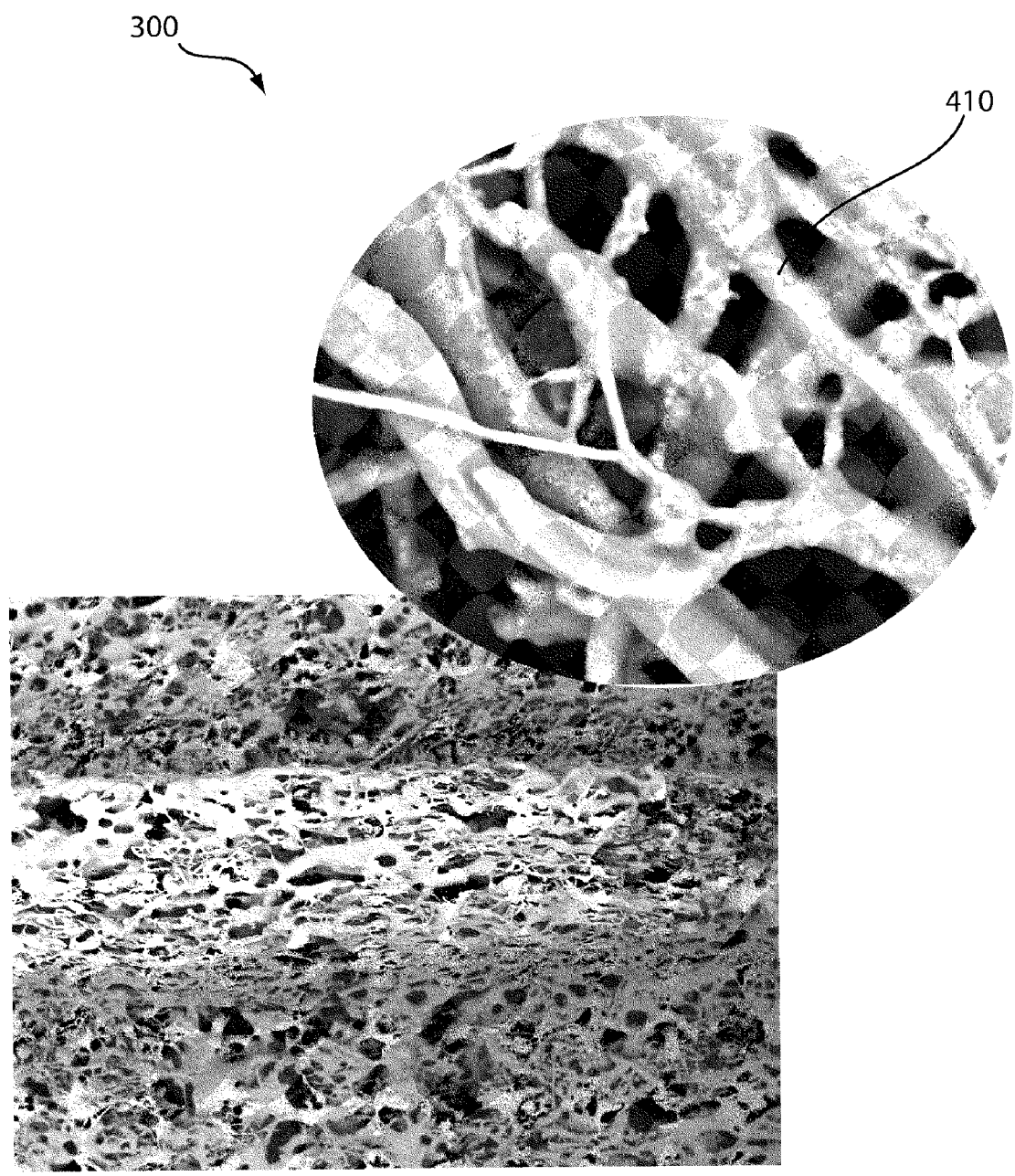
FIG. 4 is a scanning electron microscope image of a porous cordierite substrate.

FIG. 4 shows a scanning electron microscopic image of the porous structure of the cordierite substrate 300. Cordierite fibers 410 may be formed by the transformation of the cordierite precursor materials including ceramic oxide fibers or glass fibers with additional raw materials. As shown in FIG. 4, the fibrous structure may be highly porous due to the interconnected pores or void space between the fibers. The strength of the substrate may be provided by the strength of the fibrous members and/or the bonds formed between adjacent and overlapping fibers. The alignment of fibers, pore size, pore distribution, nucleation, coagulation, trapping site distribution, and pore characteristics of the substrate 300 can be controlled through alteration of the parameters of the extrusion process. For example, the rheology of the mixture, diameter and aspect ratio distribution of the fibers, characteristics of the binder and other ingredients, extrusion die design, and extrusion pressure and speed can be varied to attain desired characteristics in the resulting structure of the substrate.

For example, cordierite may be formed by using any of the following compositions of materials including fibrous cordierite precursor materials.

TABLE 1

| Material | Wt % |
| --- | --- |
| Aluminosilicate (mullite) fiber | 17.56% |
| Magnesium silicate fiber (ISOFRAX) | 12.60% |
| Hydrated magnesium silicate (talc) | 7.56% |
| HPMC | 6.11% |
| Carbon (A625) | 24.81% |
| DI Water | 31.37% |

As shown in Table 1, in one example 17.56 weight percent aluminosilicate fiber, 12.60 weight percent magnesium silicate fiber, 7.56 weight percent hydrated magnesium silicate (talc), 6.11 weight percent hydroxypropyl methyl cellulose, 24.81 weight percent carbon and 31.37 weight percent deionized water may be used as raw materials for producing a fibrous cordierite substrate.

TABLE 2

| Material | Wt % |
| --- | --- |
| Aluminosilicate (HS 95 C) fiber | 24.11% |
| Magnesium silicate fiber (ISOFRAX) | 6.38% |
| HPMC | 5.67% |
| Carbon (A625) | 23.05% |
| Magnesium carbonate ($MgCO_3$) | 7.09% |
| DI Water | 33.69% |

As shown in Table 2, in another example, 24.11 weight percent aluminosilicate fiber, 6.38 weight percent magnesium silicate fiber, 5.67 weight percent hydroxypropyl methyl cellulose, 23.05 weight percent carbon, 7.09 weight percent magnesium carbonate and 33.69 weight percent deionized water may be used as raw materials for producing a fibrous cordierite substrate.

TABLE 3

| Material | Wt % |
| --- | --- |
| Magnesium silicate fiber (ISOFRAX) | 24.90% |
| HPMC | 6.13% |
| Carbon (A625) | 24.90% |
| Alumina (P2) | 13.41% |
| DI Water | 30.65% |

As shown in Table 3, in another example, 24.90 weight percent magnesium silicate fiber, 6.13 weight percent hydroxypropyl methyl cellulose, 24.90 weight percent carbon, 13.41 weight percent alumina and 30.65 weight percent deionized water may be used as raw materials for producing a fibrous cordierite substrate.

TABLE 4

| Material | Wt % |
| --- | --- |
| Magnesium silicate fiber (ISOFRAX) | 28.38% |
| Magnesium Aluminum Silicate (Veegum) | 1.31% |
| HPMC | 6.99% |
| Carbon (A625) | 13.10% |
| Alumina (A16SG) | 15.28% |
| DI Water | 34.93% |

As shown in Table 4, in another example, 28.38 weight percent magnesium silicate fiber, 1.31 weight percent magnesium aluminum silicate, 6.99 weight percent hydroxypropyl methyl cellulose, 13.10 weight percent carbon, 15.28 weight percent alumina and 34.93 weight percent deionized water may be used as raw materials for producing a fibrous cordierite substrate.

TABLE 5

| Material | Wt % |
| --- | --- |
| Aluminosilicate (HS 95 C) fiber | 26.45% |
| Magnesium silicate fiber (ISOFRAX) | 3.31% |
| Hydrated magnesium silicate (talc) | 5.21% |
| HPMC | 6.61% |
| Carbon (A625) | 26.86% |
| DI Water | 31.57% |

As shown in Table 5, in still another example, 26.45 weight percent aluminosilicate fiber, 3.31 weight percent magnesium silicate fiber, 5.21 weight percent hydrated magnesium silicate (talc), 6.61 weight percent hydroxypropyl methyl cellulose, 26.86 weight percent carbon and 31.57 weight percent deionized water may be used as raw materials for producing a fibrous cordierite substrate.

TABLE 6

| Material | Wt % |
| --- | --- |
| Aluminosilicate (HS 95 C) fiber | 14.34% |
| Hydrated magnesium silicate (talc) | 15.96% |
| HPMC | 6.04% |
| Carbon (A625) | 24.53% |
| Alumina (A16SG) | 5.28% |
| DI Water | 33.85% |

Referring to Table 6, in yet another example, 14.34 weight percent aluminosilicate fiber, 15.96 weight percent hydrated magnesium silicate (talc), 6.04 weight percent hydroxypropyl methyl cellulose, 24.53 weight percent carbon, 5.28 weight percent alumina and 33.85 weight percent deionized water may be used as raw materials for producing a fibrous cordierite substrate.

TABLE 7

| Material | Wt % |
| --- | --- |
| Aluminosilicate (mullite) fiber | 17.67% |
| Magnesium silicate fiber (ISOFRAX) | 16.17% |
| HPMC | 6.02% |
| Carbon (A625) | 24.44% |
| Magnesium carbonate (MgCO$_3$) | 3.76% |
| DI Water | 31.95% |

In another example, shown in Table 7, 17.67 weight percent aluminosilicate fiber, 16.17 weight percent magnesium silicate fiber, 6.02 weight percent hydroxypropyl methyl cellulose, 24.44 weight percent carbon, 3.76 weight percent magnesium carbonate and 31.95 weight percent deionized water may be used as raw materials for producing a fibrous cordierite substrate.

As shown in Tables 1-7 above, combinations of different fibers, such as aluminosilicate fiber, magnesium silicate fiber and magnesium aluminum silicate, and other raw materials, such as alumina, magnesium carbonate, hydroxypropyl methyl cellulose, and carbon may be used to achieve a fibrous cordierite substrate after firing. In each table, the chemical name of the material may be accompanied by a commercial or common name for that material in parentheses. It is to be understood that such materials are exemplary and other raw materials may be used to provide the desired composition.

It is to be understood that the foregoing description is intended to illustrate and not to limit the scope of the invention, which is defined by the scope of the appended claims. Other embodiments are within the scope of the following claims. For example, though graphite powder and carbon black have been described as pore former materials, other pore formers are within the scope of the invention and may be used. Though colloidal alumina and colloidal silica are described as a source for additional alumina and silica, other raw materials may be used. Similarly, though biosoluble magnesium silicate and magnesia-alumina-silicate are described as the fiber source of magnesium silicate, other fibers containing cordierite-precursor materials are within the scope of the invention and may be used.

What is claimed is:

1. A porous cordierite fiber substrate comprising:
an extruded substrate including an extrusion composition of a fluid, at least one organic binder material and fiber including at least one cordierite precursor material, the extruded substrate being sintered to consolidate regions between the fibers and to form a fired substrate including a cordierite composition.

2. The porous cordierite fiber substrate of claim 1, wherein alumina is mixed into the extrusion composition.

3. The porous cordierite fiber substrate of claim 1, wherein silica is mixed into the extrusion composition.

4. The porous cordierite fiber substrate of claim 1, wherein magnesia is mixed into the extrusion composition.

5. The porous cordierite fiber substrate of claim 1, wherein a pore former material is mixed into the extrusion composition.

6. The porous cordierite fiber substrate of claim 5, wherein the pore former material and the fluid are substantially burned off as the extruded substrate is heated for sintering.

7. The porous cordierite fiber substrate of claim 1, wherein the at least one organic binder material and the fluid are substantially burned off as the extruded substrate is heated for sintering.

8. The porous cordierite fiber substrate of claim 1, wherein at least one of solid state bonds, glass-ceramic bonds, and crystalline bonds are formed between the fibers.

9. The porous cordierite fiber substrate of claim 1, wherein glass bonds are formed between the fibers.

10. The porous cordierite fiber substrate of claim 1, wherein the extruded substrate is sintered at a cordierite formation temperature based upon phase formation data for the fiber.

11. A porous cordierite substrate comprising:
a non-cordierite extruded substrate including one of biosoluble silica-magnesia fiber or magnesia alumina silicate fiberglass, at least one organic binder material and a fluid, the non-cordierite extruded substrate being sintered to enable formation of bonds between the fibers and to form a substrate including a cordierite composition.

12. The porous cordierite substrate of claim 11, wherein the non-cordierite extruded substrate further includes a pore former material.

13. The porous cordierite substrate of claim 12, wherein the pore former material and the fluid are substantially burned off as the non-cordierite extruded substrate is heated for sintering.

14. The porous cordierite substrate of claim 11, wherein the fluid is de-ionized water.

15. The porous cordierite substrate of claim 11, wherein the at least one organic binder material and the fluid are substantially burned off as the non-cordierite extruded substrate is heated for sintering.

16. The porous cordierite substrate of claim 11, wherein at least one of solid state bonds, glass-ceramic bonds, and crystalline bonds are formed between the fibers.

17. The porous cordierite substrate of claim 11, wherein glass bonds are formed between the fibers.

18. The porous cordierite substrate of claim 11, wherein the non-cordierite extruded substrate is sintered at a cordierite formation temperature for the substrate including biosoluble silica-magnesia fiber or magnesia alumina silicate fiberglass.

* * * * *